Feb. 28, 1928.

H. A. AFFEL 1,660,405

HIGH FREQUENCY MEASURING SYSTEM

Filed Nov. 21, 1924

INVENTOR
H. A. Affel
BY
ATTORNEY

Patented Feb. 28, 1928.

1,660,405

UNITED STATES PATENT OFFICE.

HERMAN A. AFFEL, OF MAPLEWOOD, NEW JERSEY, ASSIGNOR TO AMERICAN TELEPHONE AND TELEGRAPH COMPANY, A CORPORATION OF NEW YORK.

HIGH-FREQUENCY-MEASURING SYSTEM.

Application filed November 21, 1924. Serial No. 751,407.

This invention relates to high frequency measuring systems, and particularly to an arrangement adapted not only to measure the impedance of a circuit at high frequencies but also to determine the magnitudes of the component elements of such impedance.

In my copending application, Serial No. 751,406, filed November 21, 1924, there is disclosed a method and means for measuring high frequency impedance, the method consisting in balancing an unknown direct current potential by a similar known potential, the direct current potential being produced by rectification or other method of conversion of unknown and known currents, respectively, of frequencies at which it is desired to measure. By translating the alternating currents into proportional direct current potentials, and by opposing these potentials in a circuit having a galvanometer, a visual indication of the balance of the high frequency currents is thereby afforded and it is thus possible to eliminate serious errors which were introduced into such measurements by the testing apparatus heretofore used.

The object of the present invention which embodies the general principle set forth above is to measure impedance and also to determine the resistance and the reactance components thereof.

Figure 1:
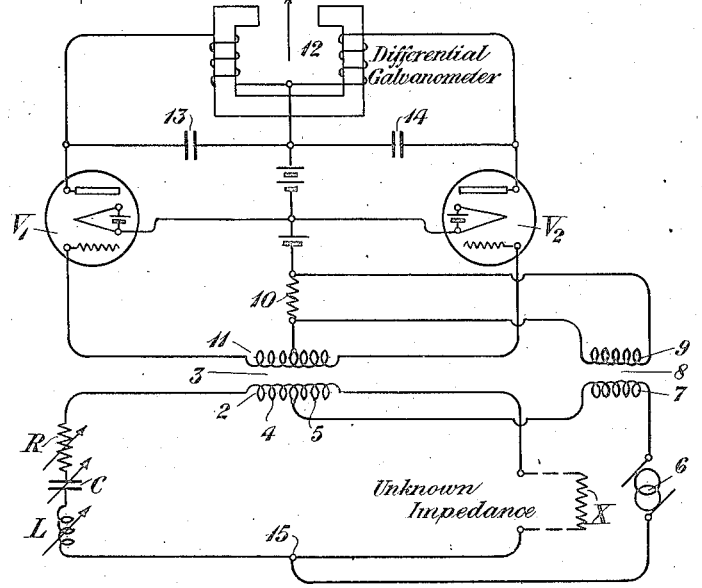
Figure 2:
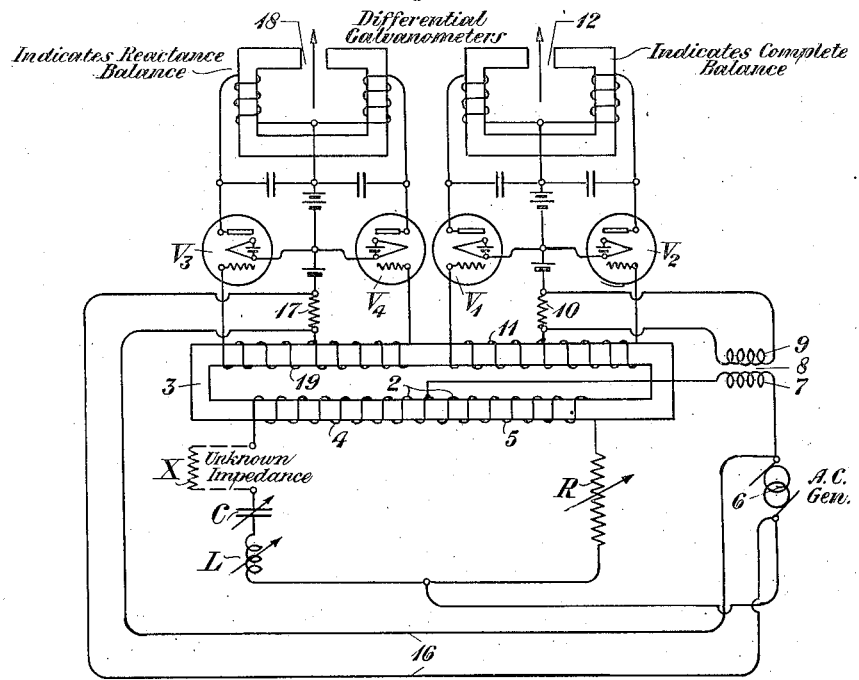

Other objects of this invention will be apparent from the following description when read in connection with the attached drawing, of which Figure 1 is a form of embodiment of the invention for determining the magnitude of an unknown impedance and Fig. 2 shows an arrangement for separate determination of the components of an impedance.

In Fig. 1 of the drawing, X represents an impedance whose value is unknown, and which it is desired to determine. While any impedance may be measured by this arrangement, for the purpose of illustration we will assume that the impedance whose value is to be determined is that of a line circuit. The elements, R, L, C, represent resistance, inductance and capacity, each element being preferably variable and of known value. These elements, taken together, constitute the known impedance. The known and the unknown impedance are connected with the winding 2 of the transformer 3. This winding is divided into two parts, 4 and 5 which are preferably equal. The junction point of the windings 4 and 5 is connected with the source 6 of alternating current which, in turn, is connected with the junction point of the known and the unknown impedances. The connection with the source 6 of alternating current includes the winding 7 of the transformer 8 which has a secondary winding 9 by means of which an alternating voltage is applied across the impedance 10 of the balanced homodyne detector. This balanced detector is of the type shown in the patent to Carson, No. 1,449,382, which issued on March 27th, 1923. The secondary 11 of transformer 3 is connected with the input side of the detector comprising the vacuum tubes $V_1$ and $V_2$. The output sides of the tubes are connected in such manner with the differential galvanometer 12 that the homodyne current applied across the impedance 10 produces no effect upon the apparatus connected in the output circuit, assuming that the apparatus is properly balanced. To insure against the effect of high frequency current in the output side affecting the galvanometer 12, condensers 13 and 14 are connected across the plate circuit to shunt any high frequency currents passing through the detector tubes.

The manner in which the system shown in Fig. 1 operates is as follows:

The high frequency testing voltage 6 is applied as stated between the junction point of the windings 4 and 5 and the junction point 15 between the known and unknown impedances. This high frequency voltage is also applied through the windings of transformer 8 across the impedance 10 connected with the common filament conductor of the vacuum tubes $V_1$ and $V_2$. Any unbalance between unknown impedance X and the known impedance consisting of the elements R, L and C, will cause a resultant flow of current through the windings 4 and 5, which resultant will cause a potential to be induced in the winding 11 of transformer 3 which will be applied to the grids of the vacuum tubes $V_1$ and $V_2$ simultaneously with the application thereto of the same high frequency potential from the same source 6. These frequencies will beat together, and the current resulting therefrom will affect the differential galvanometer 12. This galvanometer, by its ability to indicate plus or minus deflections, will afford a relative indication of the direction of the unbalance and will aid in balancing. Furthermore, it will be seen that by the series connection of the source of alternating current with that part of the circuit containing the known and unknown impedances and also with the part of the circuit containing the detector and the indicating instrument, the phase relations are maintained constant between the bridge and the detector and by proper preliminary adjustments, the detector may be operated at its maximum sensitivity at all times. If the currents flowing through X and R, L and C are not in phase, the potentials induced by them across the grids $V_1$ and $V_2$, respectively, will not be in phase. The impedance 10 also causes a potential across the grids of $V_1$ and $V_2$. This added to the potentials induced from transformer 11 results in total potentials across $V_1$ and $V_2$ which are not equal. Consequently the differential galvanometer will not register zero until the potentials across the known and unknown impedances are both equal and in phase. By varying the elements R, L and C in the adjustable branch of the measuring circuit until a condition of balance is indicated by the differential galvanometer 12, the magnitude of the unknown impedance X may be determined.

The arrangement shown in Fig. 2 is designed for the separate determination of the resistance and the reactance components of the unknown impedance. Its operation depends upon the fact that for a homodyne detector two separate conditions may induce zero galvanometer deflection, (1) where the phases between the input and the homodyne source are at 90°, and (2), where the phases between input and homodyne supply are other than 90° and the current input is zero. The arrangement shown in Fig. 2 shows a system similar to that shown in Fig. 1 in which a differential transformer forms the basis of comparison of the currents. In this arrangement, the variable known reactance L and C is inserted in series with the unknown impedance X in one branch circuit, and the variable known resistance is connected in the other branch circuit. The winding 2 of the transformer 3 comprises, as in Fig. 1, two parts, preferably equal, designated 4 and 5. The variable known inductance and capacity and the unknown impedance are connected with one of the terminals of the winding 4, and the variable known resistance R is connected with one of the terminals of winding 5. The junction of windings 4 and 5 is connected with the source of high frequency alternating curent 6, which in turn is connected with the junction of the branch circuits, one containing the known inductance and capacity and the other containing the known resistance. This connection with the high frequency generator 6 also contains a winding of transformer 8 by means of which the high frequency homodyne current is connected with the impedance 10 of the balanced detector. The voltage applied across this impedance will of course be proportional to the current flowing from the generator 6 through the bridge arms comprising the windings 4 and 5 and their associated elements. The source 6 is directly connected, by means of conductor 16, with the impedance 17 of a second balanced detector comprising the tubes $V_3$ and $V_4$. The secondary of transformer 3 consists of two windings or two groups of windings, one of which is connected with the balanced detector containing tubes $V_1$ and $V_2$ and the other of which is connected with the detector containing tubes $V_3$ and $V_4$. Each of these detector arrangements is connected as in Fig. 1 with a differential galvanometer. The galvanometer 12 indicates complete balance of the unknown impedance, and the galvanometer 18 indicates simply reactance balance.

The manner in which the reactance and resistance components of the unknown impedance are determined separately is as follows: The reactance component is first determined by a balance obtained on a galvanometer 18 with the circuit connected to vacuum tubes V—3 and V—4 and making use of one of the conditions set forth hereinbefore, namely, that the balancing of a homodyne detector to produce zero deflection of the galvanometer may be effected by having the phases of the input and homodyne supply displaced 90°. This will be achieved if the potential across resistance 17 and the potential induced in winding 19 are at 90° with each other. Since the relation between the potential in transformer winding 19 and the resultant current of the primary windings 4 and 5 will, by the usual transformer action, provide a 90° phase relation, the balancing of the homodyne detector circuit will therefore be accomplished if the currents of circuits 16 and the effective current of circuit 4—5 are in phase. Since circuit 16 is practically pure resistance, the circuit including windings 4—5 must also be made practically pure resistance. It will be noted that the circuit containing resistance R and winding 5 is a pure resistance circuit and plays no part in determining this condition. In fact, it will be desirable in the operation of the bridge to disconnect circuit R or arrange that the resistance is set at a very high value. The remaining operation, that of insuring the balance of the differential galvanometer 18, is then brought about by manipulating variable condenser C or variable inductance L until the reactance of the unknown impedance is counterbalanced; in other words, establishing a condition of resonance in the circuit, in which case the circuit will, for the testing frequency, act like a pure resistance. The necessary condition of balance will then be established, and the known reactance, i. e., the value of C or L, will be the total reactance of the unknown impedance X. The reading will, however, be reversed in sign.

Maintaining now this condition of resonance through the circuit, the resistance component of the unknown impedance is determined by the manipulation of the variable resistance R and obtaining a balance in the galvanometer circuit 12. The series connection of the homodyne supply 6 will prevent the attainment of a balance under any condition other than the alternative set forth heretofore, namely, where the phases between input and homodyne supply are not 90° and the input current is zero. The effective input current as provided by winding 11 is of course dependent now on the establishment of zero flux through the transformer winding which is in turn dependent on the balancing of the currents in windings 4 and 5 of the primary circuit. This will take place when the resistance R is equal to the resistance of the unknown impedance, and, as previously noted, will be determined by the zero indication of galvanometer 12.

It will accordingly be seen that by means of the networks shown on these figures that it is possible to measure quickly the high frequency impedance of any circuit or apparatus, the particular advantage of the arrangement shown in Fig. 2 being that the reactance and resistance components of the unknown impedance are balanced independently and by single adjustments of the variable elements, which method is extremely simple in comparison with the usual Wheatstone bridge arrangement in which the balance is achieved only by a combined and interdependent manipulation of both reactance and resistance balancing elements.

Although this invention has been disclosed as embodied in particular forms, it is to be understood that it is capable of embodiment in other forms without departing from the spirit and scope of the appended claims.

What is claimed is:

1. In an impedance measuring system, the combination with a source of high frequency potential of a measuring circuit comprising two branches, one containing an unknown impedance in series with a known capacitance and inductance, and the other containing a known resistance, and a plurality of detecting circuits individual to and connected with the said branches of the measuring circuit, each having a differential galvanometer connected with the output side thereof.

2. In an impedance measuring system, the combination with a source of high frequency potential of a measuring circuit comprising two branches, one containing an unknown impedance in series with a known capacitance and inductance, and the other containing a known resistance, a transformer, the primary winding of which is connected with both branches of the measuring circuit and with said source of potential, a plurality of balanced homodyne detector circuits individual to and connected with the secondary windings of the said transformer, each comprising two vacuum tubes and a differential galvanometer connected with the output circuits thereof, one of said detector circuits measuring the reactance component of the unknown impedance and the other detector circuit measuring the total impedance.

3. In an impedance measuring system the combination with a Wheatstone bridge network comprising two ratio arms constituting the primary winding of a transformer, and third arm containing an unknown impedance in series with a reactance, and the fourth arm containing a variable resistance, of a source of potential connected between the midpoint of the winding constituting the ratio arms and the junction of the said third and fourth arms, and an indicating circuit comprising a balanced detector having two vacuum tubes symmetrically connected with the secondary winding of the said transformer and with the said source of potential and having a differential indicating device connected with the output of the said detector.

4. In an impedance measuring system the combination with a Wheatstone bridge network having two ratio arms, a third arm containing an unknown impedance in series with a variable reactance and a fourth arm containing a variable resistance, of an indicating circuit coupled with the said network containing a balanced detector and a differential indicating device, and a source of high frequency current connected with the said network and the said balanced detector.

5. In an impedance measuring system the combination with a transformer having a primary and a plurality of secondary windings, of a branch containing an unknown impedance in series with a variable reactance connected with one terminal of the primary winding, a second branch containing a variable resistance connected with the other terminal of the said primary winding, a source of high frequency potential connected with the midpoint of the primary winding and the junction of the first and second branches, a plurality of indicating circuits each containing a balanced detector and a differential indicating device, each indicating circuit being connected with a secondary winding of the said transformer, means to apply to one of said indicating circuits a homodyning current proportional to the current flowing through the said first and second branches, and means to apply to the other of said indicating circuits a homodyning current independent of the current in the said branches.

In testimony whereof, I have signed my name to this specification this 20th day of November, 1924.

HERMAN A. AFFEL.